United States Patent [19]

Bougathou et al.

[11] Patent Number: 5,161,900
[45] Date of Patent: Nov. 10, 1992

[54] SELF-CONTAINED LOW POWER FLUID BEARING AND BEARING SEAL

[75] Inventors: Zine-Eddine Bougathou, Rochester; Peter M. Herman, Oronoco, both of Minn.

[73] Assignee: International Business Machines, Corp., Armonk, N.Y.

[21] Appl. No.: 866,929

[22] Filed: Apr. 10, 1992

[51] Int. Cl.⁵ ............................ F16C 33/74; F16J 15/40
[52] U.S. Cl. ...................................... 384/133; 277/80
[58] Field of Search ................. 384/133, 446, 478; 277/80, 135

[56] References Cited

U.S. PATENT DOCUMENTS

| | | | |
|---|---|---|---|
| 3,746,407 | 7/1973 | Stiles et al. | 384/133 |
| 4,043,612 | 8/1977 | Orcutt | 384/133 X |
| 4,526,484 | 7/1985 | Stahl et al. | 384/133 |
| 4,531,846 | 7/1985 | Raj | 384/478 |
| 4,598,914 | 7/1986 | Furumura | 277/80 |
| 4,630,943 | 12/1986 | Stahl et al. | 384/133 |
| 4,673,997 | 6/1987 | Gowda et al. | 360/107 |
| 4,694,213 | 9/1987 | Gowda et al. | 384/133 X |
| 4,734,606 | 3/1988 | Hajec | 310/90.5 |
| 4,772,032 | 9/1988 | Raj et al. | 277/80 |
| 4,938,611 | 7/1990 | Nii et al. | 384/133 |
| 4,998,033 | 3/1991 | Hisabe et al. | 310/67 R |
| 5,011,165 | 4/1991 | Cap | 277/80 |
| 5,100,159 | 3/1992 | Bras et al. | 277/80 |

Primary Examiner—Thomas R. Hannon
Attorney, Agent, or Firm—Laurence R. Letson

[57] ABSTRACT

A bearing using magnetic fluid for lubrication is provided with a magnetic seal circuit to retain the magnetic fluid in the baring. The magnetic seal circuit comprises two annular ring magnets surrounding a shaft and placed on opposite sides of the bearing. The two ring magnets are magnetically joined by a shunt. The shunt controls stray flux and permits the disposition of the magnet at a small distance from the shaft, thus concentrating the flux in the magnetic seal gap.

11 Claims, 2 Drawing Sheets

SELF-CONTAINED LOW POWER FLUID BEARING AND BEARING SEAL

FIELD OF THE INVENTION

This invention relates to seals and bearings, and more particularly, to sealed bearings of the fluid bearing type.

BACKGROUND OF THE INVENTION

As spindles and bearings get smaller, requirements for high precision performance increase and the need for the sealing of the annulus around a shaft arises, it becomes increasingly difficult to utilize conventional design in the field of bearings and seals.

Accordingly, efforts have been made to use magnetic fluid seals to contain or prevent the magnetic fluid from migrating outside the region of the bearing and potentially contaminate the exterior region, which may contain such devices as magnetic data storage disks. With the use of relatively large size shafts, ball bearings and fluid bearings have been preferred to reduce friction between the hub and the shaft. With ball bearings, there is relatively low friction; however, ball bearings are lubricated with oils or greases. The magnetic seal may be a separate element of the assembly, merely preventing the lubricants of the ball bearing and the air contained within that chamber from passing coaxially to the shaft.

As shaft diameters are reduced along with the size of the devices within which they are contained, the practicality of miniature ball bearings becomes an issue. In some cases, the shaft diameters are reduced below two millimeters and, accordingly, the normal tolerances for the miniature ball bearings become so great in proportion to the component sizes that accuracy of positioning of the rotating element is degraded beyond acceptable limits Efforts have been made to utilize fluid bearings in place of the ball bearings with varying degrees of success. The stability of the revolving hub requires that the bearings be spaced apart from each other along the axis of the shaft to the greatest possible extent The separation of the bearings requires that either each individual bearing be designed for individual containment, thereby typically requiring an end plugging scheme to contain the fluid in the bearing; or alternatively, the use of magnetic seals to confine the fluid in the bearing cavity. Thus, in the past, the use of magnetic seals for each bearing has embodied two magnetic seals for each bearing or, alternatively, the inclusions of two or more bearings within a common fluid cavity sealed by two seals, one at each end of the fluid cavity. The inclusion of more than one bearing within the single cavity dictates that the cavity extend over substantial lengths to accommodate the multiple bearings. To fill this cavity with magnetic fluid becomes cost significant in view of the exceedingly expensive cost of the magnetic fluid used as a lubricant in the bearings and as a sealing fluid in the seals.

Any compromise in the length of the chamber in order to reduce the fluid capacity requires that the bearings be displaced closer together, thus degrading the stability of the rotating hub surrounding the shaft. Degraded hub stability directly correlates to degraded or failed operability of the disks attached to the hub.

Inasmuch as the hub, at least in the preferred embodiment, supports magnetic storage data disks which are rotated at high speed and these disks are radial flanges mounted on the exterior of the hub, the stability of the rotating hub is exceedingly important to prevent the flanges' fluctuation relative to the position of the read/write heads associated with the disks. Fluctuation of the disk surfaces during rotation can cause collisions between the disks and the read/write heads mounted in exceedingly close proximity thereto, thereby damaging the disks and/or the heads with resulting loss of stored data.

With the bearings displaced from each other as far as the disk drive assembly design permits, the stability of the hub can be maximized and undesired displacement of the read/write point on a disk minimized by the use of close tolerances and a fluid bearing.

Another consideration which is key to the operation and reliable recording of data on the disks is the control of magnetic flux. The disks are magnetic material coated for receiving electromagnetic signals and storing those electromagnetic patterns; it is essential that the stray magnetic flux not be permitted to influence the magnetic coating of any of the magnetic disks carried on the revolving hub.

With this in mind, it can be clearly seen that the use of large or very strong magnets in the magnetic circuit is undesirable inasmuch as these strong magnets may propagate stray flux at substantial distances within the housing. Inasmuch as the dimension of the shaft diameter is two millimeters and typically smaller, it can be seen that the magnet placed in a sealing circuit very easily could propagate stray flux lines passing a substantial distance away and inadvertently affect the magnetic material coating of the magnetic storage disks.

Several approaches to sealing and capturing magnetic fluid in the region of a fluid bearing are known. One approach utilizes a single magnetic seal and a physical barrier to contain the magnetic fluid within the bearing.

Examples wherein a magnetic seal is used to contain magnetic fluid within a cavity where the other end of the cavity is a physical barrier to the migration or loss of the magnetic fluid are U.S. Pat. Nos. 4,526,484 to Stahl et al.; 4,734,606 to Hajec, and 4,938,611 to Nii et al. Stahl et al. utilizes a magnetic seal to contain the magnetic fluid within a cylindrical opening formed into a block where the cylindrical opening terminates within the block and there is no second opening thereto.

Hajec utilizes a screw-threaded plug member which is inserted into the main housing, which acts as a thrust bearing surface.

The Nii et al. reference shows a closed well formed by the bearing housing elements which contains the magnetic fluid in addition to the containment of the magnetic seal structure. The magnetic seal structure only encircles the shaft at one location along its axis point.

An effort has been made to seal fluid bearings utilizing magnetic fluid on both ends of the bearing by the utilization of a single magnet and two pole pieces, as illustrated in FIG. 2 of U.S. Pat. No. 4,598,914. This figure is labeled as prior art to the patent in which it appears and its origin is unknown.

FIG. 2 of U.S. Pat. No. 4,598,914 illustrates a seal arrangement forming a magnetic circuit around and containing the bearing surfaces of a fluid bearing. The arrangement disclosed and described utilizes a single magnet and two annularly shaped pole pieces. The single magnet is a hollow tubular magnet surrounding the bearing at some substantial distance from the bearing surface. The magnet's interior cylindrical surface supports a non-magnetic bearing material likewise formed in a hollow cylindrical shape surrounding the bearing with the inner surface of the bearing material in close proximity to the exterior surface of the bearing on the shaft.

The washer shaped or annular pole pieces act to focus the magnetic flux from the ends of the magnet cylinder into close proximity with and into the shaft creating a high flux density in the gap between the pole pieces and the shaft. In this regard, the magnetic fluid is trapped in the two gaps between the pole pieces and the shaft and in the gap between the bearing surface on the shaft and the bearing surface of the non-magnetic bearing material carried by the magnet. In order to insure that an effective flux density will be present between the pole pieces and the shaft, a strong and relatively large magnet is required due to its displacement from the sealing gaps.

With such a strong and relatively large magnet, the stray flux, which is inherent with a magnet, will tend to branch outside the bounds of the magnet and the pole pieces and possibly to adversely effect any magnetic disks which may be attached to the housing.

A second problem is encountered when utilizing the arrangement described immediately above because FIG. 2 of U.S. Pat. No. 4,598,914 illustrates a housing, a magnet and a non-magnetic bearing material assembled together with the magnet sandwiched between the non-magnetic bearing material and the housing. In the typical environment requiring fluid bearings, such as in small confined areas and those areas requiring extreme precision, the parallelism of the interior and exterior cylindrical surfaces of the magnet and the non-magnetic bearing material and the interior cylindrical surface of the frame are all extremely critical. The introduction of an additional member and any variables associated with it, over and above that which is absolutely essential, is highly undesirable. The undesirability of that arrangement lies in tolerance build-up and non-parallelism of any of the surfaces discussed above which will then potentially result in bearing failure, due to the fact that the gap between the inner and outer bearing surfaces is varied in an axial direction thus resulting in inadequate lubrication and hydrostatic pressure at one end or the other of the bearing, potentially resulting in early bearing failure.

Other attempts to solve this problem include U.S. Pat. Nos. 4,630,943 and 4,673,997. Both of these patents illustrate bearings and seals displaced from each other axially along a shaft with a complete magnetic seal and magnetic circuit at each end of the cavity. Such an arrangement requires filling of the bearing cavity over its entire length and the use of relatively large quantities of very expensive magnetic fluid. Each magnetic seal at each end of the cavity is a complete magnetic circuit in and of itself and independent of the other seal at the other end of the cavity.

SUMMARY OF THE INVENTION

A magnetic seal for a fluid bearing which utilizes magnetic fluid both as the sealing media and as the lubricating fluid for the bearing is described having two separate magnets formed in annular shape to surround a rotating shaft or to rotate about a fixed shaft. The two magnets are magnetically coupled by a single magnetically permeable pole piece or shunt engaged with one end of each of the magnets; each of the magnets has a reversed pole relation from the other such that the pole piece or shunt will engage the North and the South pole on each of the magnets. The interior surface of the annularly shaped magnets surround and are closely proximate to the exterior cylindrical surface of the shaft. The shaft is formed of magnetically permeable material such as steel. The interior diameter of the pole piece or shunt is sufficiently large to form a cavity between the two magnets, the shunt and the shaft. This cavity may be large enough to accommodate a fluid bearing or bearings. The bearing or bearings may be contained within the cavity. A non-magnetic material may be used to provide the bearing surface for the shunt or pole piece which is a part of a hub surrounding the shaft. The bearing surface of the shaft is formed onto the exterior surface of the shaft itself.

The cavity will typically be slightly longer than the length of the bearing surfaces and may also include one or two thrust bearing surfaces extending radially to the shaft. The two annularly shaped magnets utilized in the seal assembly may be relatively weak magnets, due to their close proximity to the shaft at the point where the gap between the magnet and the shaft exists. The small gap thus formed will then be loadable with magnetic fluid to form the seal as well as with the magnetic fluid introduced into the cavity to lubricate the bearings.

It is, therefore, an object of the invention to seal a magnetic fluid bearing with two relatively weak magnets in close proximity to the shaft forming the magnetic gap of the seal.

It is another object of the invention to control undesired stray flux and to restrict it to regions where it will have no deleterious effect on magnetic recording media in close proximity thereto.

As is apparent from the foregoing, the disadvantages and shortcomings of the prior art are overcome while the objects of the invention are accomplished by the utilization of two relatively weak magnets in close proximity to the sealing gap formed thereby; thus producing a reduction of stray flux and control of whatever inherent stray flux there may be with engagement of the non-gap poles of the magnet with a pole piece or shunt of high magnetic permeability.

DRAWINGS

Figure 1:
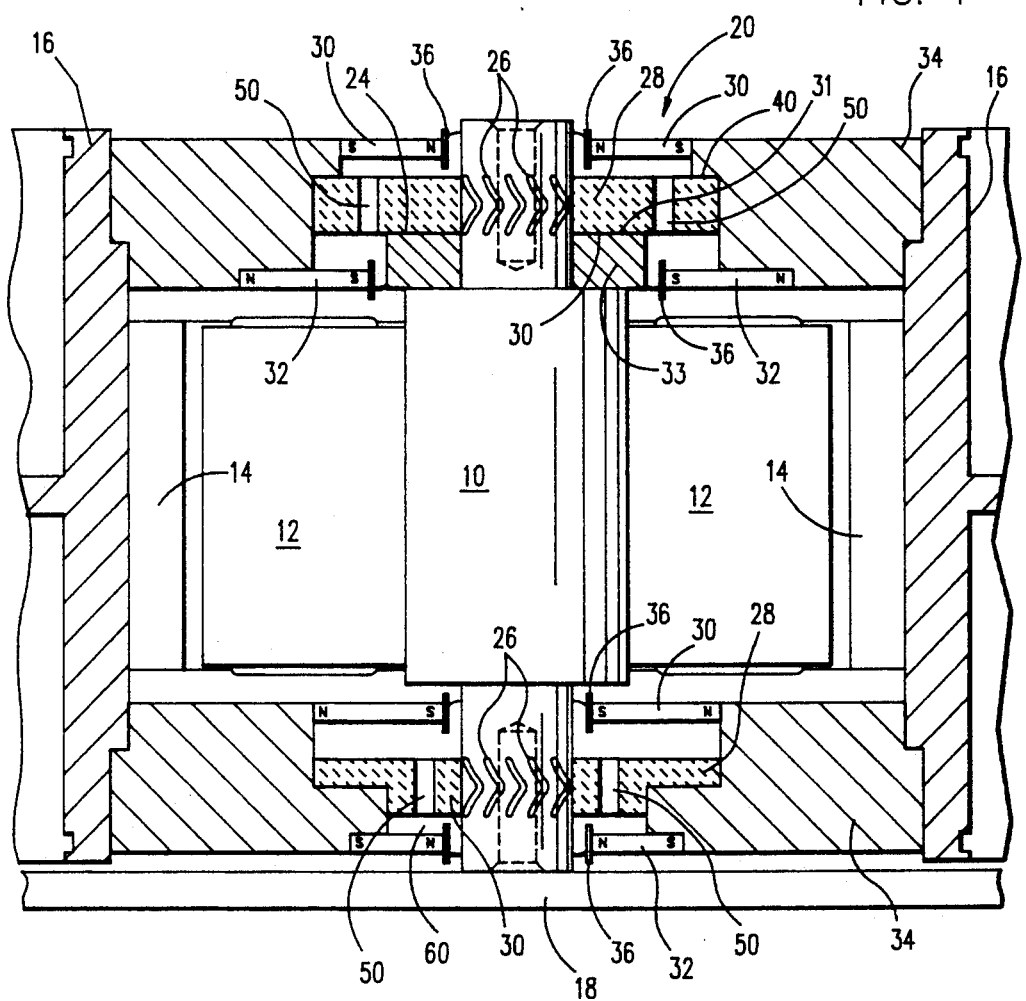
FIG. 1 illustrates a cross-sectional view of the drive portion of a magnetic disk drive utilizing fluid bearings and magnetic seals to confine the bearing fluid to the bearing region not to permit this fluid to pass into the disk region and contaminate the disks.

Functionally or structurally, similar elements in the detailed description to follow are numbered with the same reference numeral in the drawings although not necessarily identical. Where a part is numbered the same as a non-identical part in another view, the function of the part is the same as the other like numbered parts.

DETAILED DESCRIPTION OF THE INVENTION

Referring to the drawings and particularly to FIG. 1, a drive assembly for a magnetic storage disk unit is illustrated. The drive motor in the preferred embodiment of the best mode for carrying out the invention comprises a fixed shaft 10 with the field coils 12 mounted thereto and which remain stationary. The motor magnets 14 are mounted on the interior surface of the hub 16. Shaft 10 is fixedly mounted to a base 18. The shaft 10 may be mounted to base 18 after the assembly of the motor elements and bearings on the shaft 10 or prior to assembly, as desired.

Top bearing and seal assembly 20 includes a journal bearing 22 and thrust bearing surface 24. Bottom bearing 26 is provided with only a journal bearing 22.

The electric motor comprising shaft 10, windings 12 and magnets 14, acts to rotate the hub 16 around shaft 10.

Hub 16 may carry a disk pack or multiple magnetic storage disks thereon and the disks are arranged as flanges extending radially outwardly from the axis of shaft 10.

Figure 2:
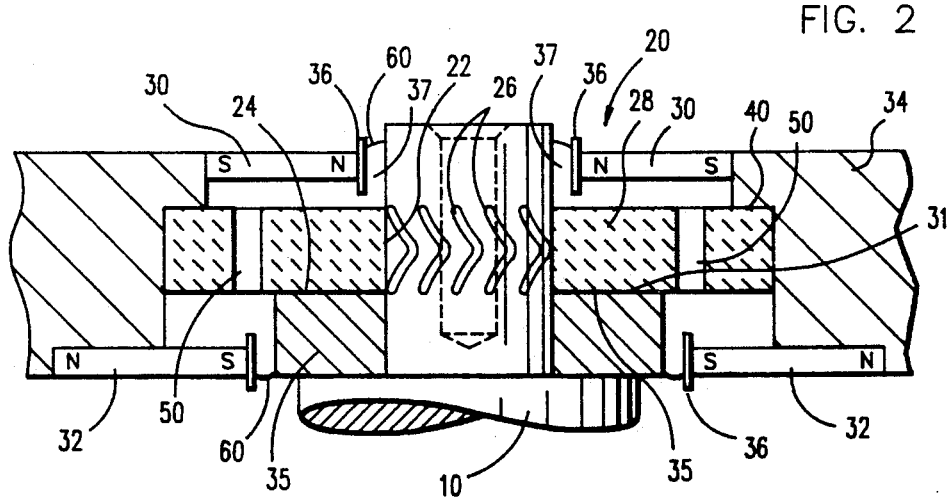
FIG. 2 is a cross-sectional enlarged view of the combined journal and thrust bearings in the top of FIG. 1.

Refer now to FIG. 2, which illustrates in greater detail and clarity, the arrangement of the upper bearing 20 as illustrated in FIG. 1.

Upper bearing 20 comprises two bearings, a journal bearing 22 and a thrust bearing 24, and a seal for containing the magnetic lubricating fluid of the bearings 22 and 24.

Shaft 10 is provided with shallow grooves 26 formed into its periphery. Grooves 26 are preferably chevron or herringbone shaped. The grooves 26 provide a pumping action with respect to the magnetic lubricating fluid and thus creates sufficient pressure build up to separate the external surface of shaft 10 from the internal surface of the non-magnetic bearing insert 28. The non-magnetic bearing insert 28 is preferably a ceramic material which has a smooth interior surface. The ceramic material is chosen both for its wear characteristics and for the characteristic of non-permeability to magnetic flux.

Ceramic bearing insert 28 is also provided with a bearing surface 24 which may engage a shoulder of shaft 10 or an insert 35 which is disposed in the bearing and seal structure. The insert 35 is preferably formed of a steel identical to that of the shaft 10 or at least chemically compatible therewith when in contact with the magnetic fluid contained within the seal assembly of FIGS. 1 and 2.

With sufficient magnetic fluid between the surfaces of the journal bearing 22, shaft 10 and the ceramic non-magnetic bearing insert 28 will rotate freely relative to each other. The chevron/herringbone shaped grooves act to build pressure between the shaft 10 and ceramic bearing insert 28, to insure lubrication of the bearing surfaces.

In order to contain the magnetic fluid 60 within the bearing 20 and to seal the bearing fluid 60 from the motor chamber and from the disk environment, two magnets 30 and 32 are positioned to surround shaft 10 and ceramic bearing insert 28. Magnet 30 and magnet 32 are both annularly shaped magnets, typically of barium ferrite or similar material, and fabricated such that the outer diameter of the magnets 30, 32 may be positioned within an annular ring 34, typically fabricated of steel. The annular ring 34 will act as a magnetic shunt 34 as will be described later. Alternative materials for the magnets include alnico, neodymium-iron-boron or samarium cobalt.

Since the annular magnet structure is typically a sintered powder and particles of the magnet material may dislodge and cause failure of the bearings 20, it is highly desirable to coat the magnets 30, 32 with a containment coating such as an epoxy paint. Coatings on precision toleranced parts destroys tolerance control. Destruction of the fine tolerances required militates against the adoption of the arrangement and design of FIG. 2 of U.S. Pat. No. 4,598,914, discussed above.

Magnets 30, 32 may be further provided with a cylindrical piece of material, typically magnetically non-permeable, such as a plastic sleeve 36 which is engaged with the interior cylindrical surface of magnets 30, 32. This sleeve 36 acts to protect the surfaces of magnets 30, 32. Magnets 30, 32 may be inserted into shunt 34 and attached to shunt 34 by means of an adhesive material or, alternatively, by press fitting. Press fitting is preferable over the adhesive attachment because the concentricity of the magnets 30, 32 and the shunt 34 are more difficult to maintain when utilizing an adhesive.

Journal bearing member 28 is provided with a smooth bearing surface 24 on its lower face which may then be engaged, when assembled, with surface 31 of steel insert 35 to form a thrust bearing. Surface 31 may be configured with spiral grooves, as is conventionally known and therefore not shown, to provide the necessary pressurization and pumping action for a thrust fluid bearing.

The shouldered configuration with shoulder surface 40 on shunt 34 provides a load carrying surface for engagement with the ceramic bearing insert 28 so that the thrust force may be exerted from steel insert 35 to ceramic bearing insert 28 and shoulder 40 to support shunt 34 and hub 16.

Figure 3:
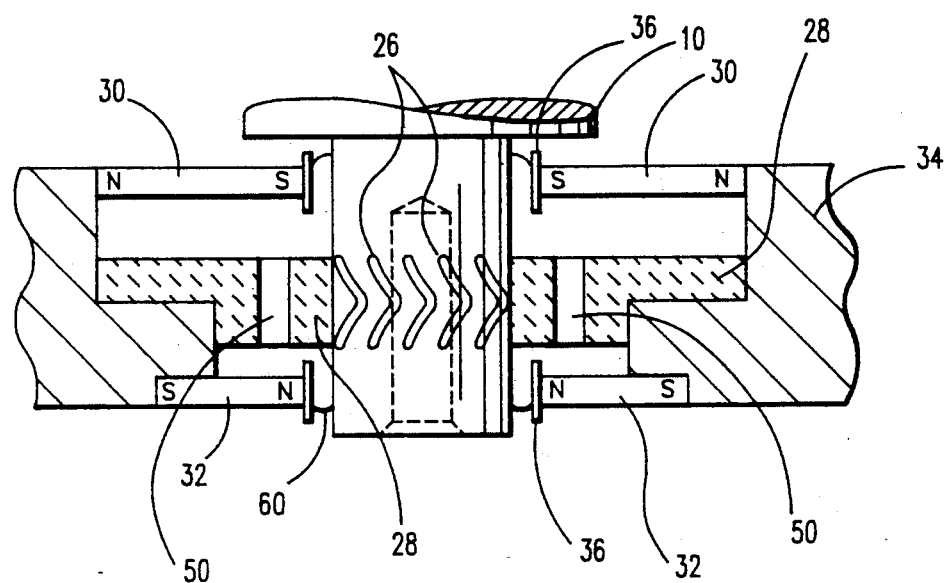
FIG. 3 is a cross-sectional enlarged view of the bottom bearing shown in FIG. 1.

Referring now to FIG. 3, which illustrates the lower bearing as shown in FIG. 1, shaft 10 is likewise provided with a chevron/herringbone type bearing groove pattern 26 as described with respect to FIG. 2. Ceramic bearing insert 28, although slightly different in shape, provides the same function with respect to bearing properties as bearing insert 28 in FIG. 2.

Magnets 30, 32 and sleeve 36 in FIG. 3 are all analogous to their earlier described counterparts of FIG. 2.

The bearing illustrated in FIG. 3 is a journal bearing and has no thrust bearing capability. Accordingly, there is no thrust bearing surface on the ceramic bearing insert 28.

Shunt 34 provides the same function and properties as the earlier described shunt 34 in FIG. 2.

Referring now to both FIGS. 2 and 3, passages 50 are formed through the ceramic bearing member extending from the region of magnet 32 to the region of magnet 30. Passage 50 provides for circulation of the magnetic lubricating fluid 60 throughout the cavity formed by shaft 10, magnets 30, 32 and shunt 34. The circulation of the fluid 60 is essential to prevent overheating and undue degradation of the lubricating qualities of the magnetic fluid 60.

In both FIGS. 2 and 3, magnets 30 and 32 are oriented opposite to each other with regard to polarity. It can be seen from the arrangement of magnet 30 with its North pole in contact with shunt 34 and the arrangement of magnet 32 with its South pole in contact with shunt 34 and the remaining poles in close proximity to shaft 10, a magnetic circuit is formed wherein the shaft 10 completes the circuit formed by magnet 30, shunt 34 and magnet 32. This circuit will not only seal in the regions between shaft 10 and magnet 30 and the region between bearing insert 28 and thrust bearing insert 35 and magnet 32; but the circuit will contain the magnetic fluid 60 enclosed within the interior of the flux path thus maintaining adequate magnetic fluid 60 for lubrication and proper operation of the bearing assembly 20.

Figure 4:
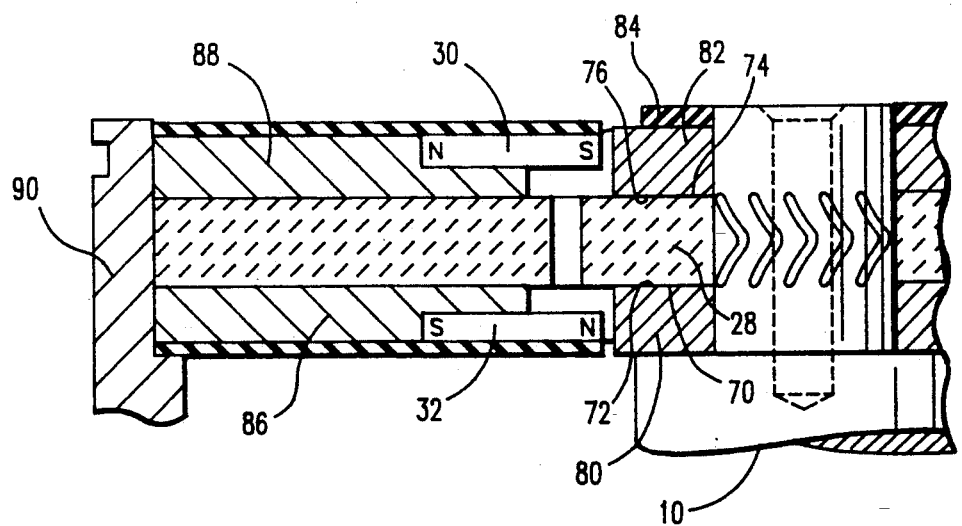
FIG. 4 is a partial cross-sectional view of a hydrodynamic journal bearing and two opposed hydrodynamic thrust bearings enclosed with a magnet seal circuit of the invention.

An alternative embodiment of the invention is shown in FIG. 4. The journal bearing ceramic insert 28 is provided with an upper thrust bearing surface 74 and lower thrust bearing surface 70. These two surfaces 70, 74 are parallel and respectively face against thrust bearing rings 80, 82. The two opposed pairs of thrust bearing surfaces will constrain the ceramic insert 28 from axial movement along the axis of shaft 10.

The magnets 30, 32 are functionally identical to those in FIGS. 1 and 2.

As with the thrust bearing surfaces 24, 31 of FIG. 2, the surfaces 70, 72 and 74, 76 may be provided with spiral grooves to provide the pumping action on the magnetic fluid.

Positioning ring 84 is provided to position ring 82 and journal bearing insert 28 relative to ring 80 and control spacing between the thrust bearing surfaces 70, 72 and 74, 76.

Shunts 86, 88 magnetically connect the magnets 32, 30 respectively to hub 90 to complete the flux path through the hub 90.

From the description of FIG. 4, it is appreciated that the seal circuit comprising two relatively weak magnets 30, 32, a shunt path 86, 90, 88 and the shaft 10 may enclose a journal bearing as well as two thrust bearings.

By utilizing the magnets 30, 32 themselves at the gaps 37 and disposing the magnets 30, 32 such that the interior surface of the annular magnet ring 30 or 32 is disposed proximate to the exterior of shaft 10, a very high flux density at the gap 37 is accomplished without the use of an unduly strong or large magnet. Interconnecting the two magnets 30, 32 with the shunt 34 acts to complete the flux path and, at the same time, constrains and controls the flux generated by magnets 30, 32 and prevents undue stray flux from escaping from the flux circuit path. By the use of steel in shunt 34, the shunt 34 controls and constrains the flux to the interior of the shunt 34 to a very high degree; stray flux is prevented from propagating into the disk environment, inadvertently affecting the magnetic storage disks, and potentially destroying valuable data stored on the disks.

The need for a large, strong single magnet is overcome and the possibility of the large, strong single magnet propagating stray flux into the magnetic storage disk environment is eliminated by the use of the weaker magnets 30, 32 positioned to focus their flux in a very concentrated area of the gaps 37 between the magnets 30, 32 and the shaft 10.

The foregoing preferred embodiment of the best mode for carrying out the invention has been described, but it should be understood that variations and changes may be made without departing from the scope and spirit of the invention as set forth by the claims.

We claim:

1. A magnetic fluid bearing and seal assembly comprising:
   a magnetically permeable shaft;
   a hub surrounding said shaft;
   a pair of fluid bearing surfaces, one of said pair of said surfaces on each of said shaft and said hub;
   a pair of magnets surrounding said shaft and disposed with one pole of each of said magnets proximate to said shaft, said poles of said magnets being of magnetically opposite polarity to each other;
   an annular magnetic permeable shunt magnetically coupled with said magnets;
   said shunt, said magnets and said shaft forming a magnetic circuit carrying a flux concentration, said bearing surfaces disposed and contained within said flux path.

2. The magnetic fluid bearing and seal assembly of claim 1 further comprising a magnetic fluid.

3. The magnetic fluid bearing and seal assembly of claim 2 wherein said bearing surfaces are separated by said fluid.

4. The magnetic fluid bearing and seal assembly of claim 3 wherein said magnets and said shaft form a gap and flux concentration in said magnetic circuit and said magnetic fluid is attracted into said flux concentrations at said gaps.

5. The magnetic fluid bearing and seal assembly of claim 2 further comprising at least two additional fluid bearing surfaces, at least one of said additional fluid bearing surfaces disposed on each of said hub and said shaft and contained within said flux path.

6. The magnetic fluid bearing and seal assembly of claim 5 wherein at least one of said pairs of said bearing surfaces being a surface of a cylindrical shape forming a journal bearing.

7. The magnetic fluid bearing and seal assembly of claim 5 wherein said additional bearing surfaces are disposed radially from said shaft forming thrust bearings.

8. The magnetic fluid bearing and seal assembly of claim 7 comprising circulatory passages disposed to communicate with one end of said journal bearing and said thrust bearings.

9. The magnetic fluid bearing and seal assembly of claim 2 comprising circulatory passages disposed to communicate with both ends of said bearing surfaces.

10. The magnetic fluid bearing and seal assembly of claim 1 wherein one of said bearing surfaces is a non-metallic non-magnetic material.

11. The assembly of claim 10 wherein said non-metallic non-magnetic material comprises a ceramic.

* * * * *